United States Patent
Dannhorn et al.

(12) 
(10) Patent No.: US 6,891,034 B2
(45) Date of Patent: May 10, 2005

(54) PROCESS FOR PREPARING ALKYLHYDROXYALKYL CELLULOSE

(75) Inventors: Wolfgang Dannhorn, Soltau (DE); Hartwig Schlesiger, Fallingbostel (DE); Jörn-Bernd Pannek, Fallingbostel (DE); Gerolf Weissach, Leverkusen (DE)

(73) Assignee: Wolff Walsrode AG, Walsrode (DE)

(*) Notice: Subject to any disclaimer, the term of this patent is extended or adjusted under 35 U.S.C. 154(b) by 157 days.

(21) Appl. No.: 09/923,011

(22) Filed: Aug. 3, 2001

(65) Prior Publication Data

US 2002/0038018 A1 Mar. 28, 2002

(30) Foreign Application Priority Data

Aug. 10, 2000 (DE) .......................... 100 38 978

(51) Int. Cl.$^7$ .............. C08B 11/00; C08B 11/193; C08B 11/02; C08B 11/08
(52) U.S. Cl. ............... 536/84; 536/90; 536/91; 536/95; 536/96; 536/99; 536/100
(58) Field of Search ............. 536/84, 90, 91, 536/95, 96, 99, 100

(56) References Cited

U.S. PATENT DOCUMENTS

| | | | |
|---|---|---|---|
| 2,949,452 A | 8/1960 | Savage | 260/231 |
| 3,839,319 A | 10/1974 | Greminger, Jr. et al. | 260/231 |
| 4,096,325 A | 6/1978 | Teng et al. | 536/91 |
| 4,477,657 A | 10/1984 | Strange et al. | 536/91 |
| 4,650,863 A | 3/1987 | Felcht et al. | 536/90 |
| 5,166,333 A | 11/1992 | Breckwoldt | 536/84 |
| 5,493,013 A | 2/1996 | Reichel | 537/84 |
| 6,235,893 B1 * | 5/2001 | Reibert et al. | 536/86 |

OTHER PUBLICATIONS

Houben–Weyl, Methoden der Organischen Chemie, Makromolekulare Stoffe, 4$^{th}$ edition (month unavailable) 1987, vol. 3 20, pp. 2042–2043, Polysaccharid–Derivate Dr. Konrad Engelskirchen.

* cited by examiner

*Primary Examiner*—James O. Wilson
*Assistant Examiner*—Everett White
(74) *Attorney, Agent, or Firm*—Joseph C. Gil; James R. Franks

(57) ABSTRACT

Described is a process of preparing alkylhydroxyalkyl cellulose, e.g., methylhydroxypropyl cellulose (MHPC). The process includes: (a) alkylating cellulose with an aqueous caustic solution containing from 1.5 to 5.5 equivalents of alkali metal hydroxide, e.g., NaOH, per anhydroglucose unit (AGU) of said cellulose, in the presence of a suspension agent, e.g., dimethyl ether, which contains alkyl halide, e.g., methyl chloride, in an amount of from (equivalents of alkali metal hydroxide per AGU minus 1.4) to (equivalents of alkali metal hydroxide per AGU plus 0.8); (b) reacting the alkalised cellulose of step (a) with one or more alkylene oxides, e.g., propylene oxide, at a temperature higher than 65° C., e.g., 85° C.; (c) adding alkyl halide, to the product of step (b), in an amount of at least the difference between (i) the equivalents of alkyl halide per AGU in step a) and (ii) the equivalents of alkali metal hydroxide added per AGU in step (a), provided that the amount of additionally added alkyl halide is at least 0.2 equivalents per AGU; and (d) isolating alkylhydroxyalkyl cellulose from the reaction mixture of step (c). Optionally the isolated alkylhydroxyalkyl cellulose may be purified.

7 Claims, No Drawings

PROCESS FOR PREPARING ALKYLHYDROXYALKYL CELLULOSE

FIELD OF THE INVENTION

The invention described here provides a process for preparing alkylhydroxyalkyl cellulose, preferably methylhydroxyethyl cellulose (MHEC) and methylhydroxypropyl cellulose (MHPC), particularly preferably methylhydroxypropyl cellulose with a defined DS (degree of substitution) by methyl groups and a defined MS (molar substitution) by hydroxyalkyl groups, preferably hydroxyethyl groups and hydroxypropyl groups, particularly preferably hydroxypropyl groups. The process according to the invention enables, with high chemical yield and good reproducibility, a wide variation in the structural features of the product represented by the proportional and total extent of substitution and also the molecularity (final viscosity). The resulting products range from being soluble in water up to being soluble in organic solvents, depending on the degree of substitution, and may be used in a wide variety of applications, for example as consistency regulators and processing aids in mineral and dispersible constructional materials or for preparing cosmetic and pharmaceutical preparations.

BACKGROUND OF THE INVENTION

The species-rich class of substances known as cellulose ethers, including the group of binary alkylhydroxyalkyl celluloses containing the commercially utilized representative methylhydroxypropyl cellulose (MHPC), has been studied for many decades in university and industrial spheres of activity and has been described many times. A review of the chemical background and principles of preparation (methods of preparation and process steps) and a material survey and description of the properties and opportunities for application of the various derivatives of cellulose ethers is given, for example, in Houben-Weyl, Methoden der Organischen Chemie, Makromolekulare Stoffe, 4th edition, vol. E 20, p. 2042 (1987).

The methods described and used for preparing alkylhydroxyalkyl celluloses, such as methylhydroxypropyl cellulose, are based on either heterogeneous (multiphase mixture of substances) or homogeneous (e.g., single-phase solution) reaction management. The process itself may be performed as either a batchwise or a continuous procedure. Furthermore, in the case of a heterogeneous mode of reaction, the so-called gas phase process (without a fluid reaction medium) is differentiated from the so-called slurry process (in the presence of a fluid reaction medium).

All the process variants described and industrially utilized for preparing alkylhydroxyalkyl celluloses, e.g., methylhydroxyalkyl cellulose, are based on the following chemical principle of reaction. In a preliminary sub-step, the cellulose starting material is activated, preferably with a caustic alkali solution. Then, the alkali metal cellulose formed is force-reacted with the corresponding alkylene oxide and methyl chloride, wherein any optionally used excess alkali is expediently neutralised with more than the stoichiometric amount of methyl chloride. In the subsequent purification step, the salt formed and any other secondary products are removed, preferably by washing with hot water.

DE-A 2402740, U.S. Pat. No. 2,949,452 and EP-B 134465 describe so-called gas phase processes for preparing MHPC in which no fluid or condensed media are present during the etherification reaction. The substitution (DS and MS values) can be varied over a wide range when using this process. Due to the lack of a fluid heat transfer medium, however, the exothermic character of the chemical reaction can be controlled only inadequately; in addition, there are problems with distributing the alkali and reactants used. All in all, this is expressed by only moderate reproducibility of the substitution and uncontrolled and relatively severe degradation of the molecular weight and thus results in a variable set of properties for the product. Moreover, highly viscous products are not obtainable via the gas phase process due to severe degradation of the molecular weight.

The problems mentioned when discussing the gas phase process occur to a much smaller extent, if at all, in the presence of a fluid reaction medium. Thus, in the so-called slurry process, inert organic solvents, the reactant methyl chloride in excess, or an appropriate mixture thereof, normally function as a distribution medium and heat transfer medium. The reaction medium present during the activation and reaction phases brings about, on the one hand, more uniform substitution with higher reproducibility and higher chemical yields, due to more uniform alkalisation of the cellulose and better transport of the reactants into the alkali metal cellulose. On the other hand, the process is altogether more controllable as a result of effective heat dissipation and degradation of the molecular weight is clearly suppressed due to the avoidance of localised overheating, so very highly viscous products are also obtainable. Due to these chemical engineering and product property advantages, the method of preparation used on an industrial scale has largely evolved as a slurry process.

The disadvantage of the standard slurry process, in which the entire amounts of the reactants alkylene oxide and methyl chloride are present alongside each other during the etherification phase, is that the degree of substitution MS can be adjusted to only a limited extent. For example, in the case of methylhydroxypropyl cellulose, exclusively products with a high DS (methyl) and a low MS (hydroxypropyl) are produced by formal parallel reaction of the reactants. The reverse product variants, i.e., high MS (hydroxypropyl) and average to low DS (methyl), are not obtainable using this type of procedure for reaction kinetic reasons, even when increasing the amount of propylene oxide used. The aforementioned highly propoxylated MC derivatives, however, are of interest due to a number of substance-specific properties.

According to U.S. Pat. No. 4,096,325, highly propoxylated MC derivatives can be prepared if the hydroxypropylation and methylation are performed in a manner which keeps them largely separated. EP-A 567869, for example, describes, as a process of just this type, the stepwise reaction of the alkali metal cellulose generated, initially with propylene oxide and then, in a solvent, with methyl chloride. The DS and MS values can be varied over a wide range in this way.

In the case of process variants specified with stepped reaction management, hydroxypropylation is generally performed at high temperatures. On the other hand, methylation, which is a reaction which proceeds exothermally per se, is performed with counter-cooling at relatively low temperatures. Due to the long process times and the counter-flow of energy, this process is less suitable for economically viable large-scale production. In addition, with increasing separation of the reaction steps, in the same way as in the gas phase reaction, problems occur with regard to the uniformity and reproducibility of substitution, temperature management and molecular weight degradation (final viscosity).

Due to the disadvantages mentioned in the preparative variants which have hitherto been developed and described, there is a constant demand for a process which provides both the chemical engineering and product-specific, and economic, advantages of a slurry process along with the flexibility involved in a gas phase process with regard to obtaining yields and arrangements of the relative proportions of the degrees of substitution MS and DS over a wide range.

The background to the present invention was therefore the provision of a process for preparing alkylhydroxyalkyl celluloses, such as methylhydroxyethyl cellulose and methylhydroxypropyl cellulose, which facilitates, with high reproducibility and chemical yields, a wide variation in the degrees of substitution MS and DS and also the product viscosity.

SUMMARY OF THE INVENTION

Surprisingly, a solution to the problem was found of the type such that products which have hitherto been obtainable to only a restricted extent, or not at all, with regard to chemical engineering and economic viability, are obtained in a form of slurry process with a comparatively low degree of correction to the stoichiometry of the reaction system and thermally strongly forced process management.

The invention provides an improved process, as compared with the prior art, for preparing alkylhydroxyalkyl celluloses from cellulose and alkylating agents in the presence of a caustic alkali solution and one or more suspension agents and also separation and purification of the reaction products, preferably by washing with hot water or washing with organic media.

In accordance with the present invention, there is provided a process for preparing alkylhydroxyalkyl cellulose comprising the steps of:
a) alkalizing cellulose with an aqueous caustic solution containing from 1.6 to 5.5 equivalents of alkali metal hydroxide per anhydroglucose unit (AGU) of said cellulose, in the presence of a suspension agent which contains alkyl halide in the amount of from (equivalents of alkali metal hydroxide per AGU minus 1.4) to (equivalents of alkali metal hydroxide per AGU plus 0.8);
b) reacting the alkalised cellulose of sep a) with one or more alkylene oxides at a temperature higher than 65° C.;
c) adding alkyl halide, to the product of step b), in an amount of at least the difference between (I) the equivalents of alkyl halide per AGU in step a) and (II) the equivalents of alkali metal hydroxide added per AGU in step a), provided that the amount of additionally added alkyl halide is at least 0.2 equivalents per AGU;
d) isolating alkylhydroxyalkyl cellulose from the reaction mixture of step c); and
e) optionally purifying the isolated alkylhydroxyalkyl cellulose.

Other than in the operating examples, or where otherwise indicated, all numbers expressing quantities of ingredients, reaction conditions, etc. used in the specification and claims are to be under stood as modified in all instance by the term "about."

DETAILED DESCRIPTION OF THE INVENTION

The core features of the reaction technique used in the improved method of preparation according to the invention are to initially alkalise (activate) cellulose in the presence of defined amounts and ratios of alkyl halide and suspension agent, to partly etherify by the targeted addition of defined amounts of alkylene oxide in a first phase and to complete etherification in a second phase, each time adding a further defined amount of alkyl halide and, if required, subsequently adding alkylene oxide.

A suitable starting material which may be mentioned is cellulose in the form of wood pulp or cotton linters. Furthermore, other polysaccharides, e.g., guar gum, starch, etc., may also be used. The solution viscosity of the etherification products can be varied over a wide range by appropriate choice of the polysaccharides. Milled wood pulp and milled linters cellulose or mixtures of these are preferentially suitable.

Alkalisation (activation) of the polysaccharides is performed with inorganic bases, preferably alkali metal hydroxides in aqueous solution such as sodium hydroxide and potassium hydroxide, preferably with 35 to 60 wt. % strength caustic soda solution, particularly preferably with 48 to 52 wt. % strength caustic soda solution.

The suspension agents used include, for example, $C_1$–$C_5$ dialkyl ethers, e.g., dimethyl ether (DME), $C_5$–$C_{10}$-alkanes (e.g., cyclohexane or pentane), aromatic compounds (e.g., benzene or toluene), alcohols (e.g., i-propanol or t-butanol), ketones (e.g., butanone or pentanone), open chain or cyclic ethers (e.g., dimethoxyethane or 1,4-dioxan), and mixtures of the suspension agents mentioned in varying ratios by weight. The particularly preferred inert suspension agent is dimethyl ether (DME).

Suitable compounds for O-alkylation are straight chain or branched $C_1$ to $C_6$-alkyl halides (e.g., methyl chloride (MCL), ethyl chloride, ethyl bromide and propyl halides, such as propyl iodide). Methyl chloride and ethyl chloride are preferred, particularly preferably methyl chloride. Alkylation reagents with ionic functions, (e.g., monochloroacetic acid, N-(2-chloroethyl)diethylamine and vinylsulfonic acid) may also be used.

Suitable reagents for introducing hydroxyalkyl groups include, for example, alkylene oxides, e.g., ethylene oxide (EO), propylene oxide (PO) and butylene oxide (BO), and acrylonitrile. Propylene oxide is particularly preferred.

For gradual and variable cross-linking of the cellulose ether during the course of preparation, bifunctional reagents, such as dichloroethene or epichlorhydrin, may be used.

The process according to the invention is used to prepare binary, ternary and quaternary alkylhydroxyalkyl celluloses (AHAC), preferably for preparing the binary derivatives methylhydroxyethyl cellulose (MHEC) and methylhydroxypropyl cellulose (MHPC), particularly preferably for preparing methylhydroxypropyl cellulose.

As alkali metal hydroxide is NaOH, as alkyl halide MCl preferred. In the following description of the process NaOH and MCl exemplary mentioned for alkali metal hydroxide and alkyl halide respectively. When performing the process in practice, milled or shredded cellulose is generally initially introduced in an inert condition. Then the cellulose substrate is suspended in a mixture of DME/MCL I, wherein the DME/MCL I ratio is 70:30 to 20:80 parts by weight, preferably 65:35 to 40:60 parts by weight and particularly preferably 60:40 to 50:50 parts by weight. The amount of MCL I in the first process step is characterised as follows, wherein the unit "eq" stands for the molar ratio of the particular feedstock relative to the anhydroglucose unit (AGU) of the cellulose used: minimum eq MCL I=eq NaOH per AGU minus 1.4 and maximum eq MCL I=eq NaOH per AGU plus 0.8. The preferred amount of MCL I in the first process step is: minimum eq MCL I=eq NaOH per AGU minus 1.0 and maximum eq MCL I=eq NaOH per AGU plus 0.3. The particularly preferred amount of MCL I in the first process step is: minimum eq MCL I=eq NaOH per AGU minus 0.5 and maximum eq MCL I=eq NaOH per AGU plus 0.1. The very particularly preferred amount of MCL I in the first process step is: minimum eq MCL I=eq NaOH per AGU minus 0.5 and maximum eq MCL I=eq NaOH per AGU minus 0.1.

Alkalisation of the cellulose used is performed with 1.5 to 5.5 eq NaOH per AGU, preferably with 2.2 to 3.0 eq NaOH per AGU, particularly preferably with 2.4 to 2.9 eq NaOH per AGU. In general alkalisation is performed at temperatures of 15 to 50° C., preferably about 40° C., and for 20 to 80 minutes, preferably for 30 to 60 minutes. The NaOH is preferably used in the form of a 35 to 60 percent by weight strength aqueous solution, particularly preferably as 48 to 52 wt. % strength caustic soda solution.

After the alkalisation phase, the hydroxyalkylation agent (e.g., an alkylene oxide, such as propylene oxide (PO) when preparing methylhydroxypropyl cellulose) is added and the reaction is thermally forced by heating. Addition of the hydroxyalkylation agent may also take place during the heating phase. Reaction between the hydroxyalkylation agent (for example PO) and alkyl halide, e.g., MCL I, takes place at 60 to 110° C., preferably at 70 to 90° C., particularly preferably at 75 to 85° C. The amount of alkylene oxide, e.g., PO, added is specifically adjusted, depending on the extent of substitution required. For MHPC products which are commonly used in a range of applications, the amount of PO used is 0.1 to 5 eq per AGU, preferably 0.2 to 2.5 eq per AGU, particularly preferably 0.4 to 1.6 eq per AGU. Addition of alkylene oxide, e.g., PO, to the reaction system may take place all at once or may be divided into several addition steps. Addition is preferably performed in one step, particularly preferably in one step directly after finishing the alkalisation phase.

After the etherification phase, without substantial cooling, the amount of alkyl halide II, e.g., MCL II, required for the desired extent of substitution with methyl groups is added, this being characterised as follows: minimum eq MCL II=eq NaOH minus eq MCL I plus 0.3, or minimum eq MCL II=0.2 eq MCL per AGU, when the amount of MCL II calculated using the aforementioned formula is less than 0.2 eq MCL per AGU. Preferably, eq MCL II=1 to 3.5 eq MCL per AGU, particularly preferably eq MCL II=1.5 to 2.5 eq MCL per AGU are used. Addition of the amount of alkyl halide II, e.g., MCL II, is performed at a temperature higher than 65° C., preferably at 75 to 90° C., or at the temperature which prevails at the end of the hydroxyalkylation phase.

After completion of the second etherification phase, all the volatile constituents are removed by distillation, optionally under reduced pressure. Purification, drying and milling of the resulting product is performed using methods conventionally used in the cellulose derivative sector, in accordance with the prior art.

The examples which follow are intended to explain the process according to the invention and to describe the resulting products without restricting the invention.

EXAMPLES

In the following preparative examples, the unit "eq" stands for the molar ratio of the particular feedstock relative to the anhydroglucose unit (AGU) of the cellulose used.

Examples 1 to 7 (MHPC)

In a 5 l autoclave, 260 g of cotton linters (moisture content: 6.6%; in cupriethylenediamine: 1480 ml/g) are placed under an inert atmosphere by evacuating and refilling with nitrogen. Then a mixture of x g of dimethyl ether and y eq of methyl chloride is added to the reactor. Then 2.6 eq of sodium hydroxide in the form of a 50 wt. % strength aqueous caustic soda solution are sprayed onto the cellulose with stirring. After stirring for 60 minutes at 25° C., 0.8 eq of propylene oxide are added to the reactor and the mixture is heated to 85° C. After stirring for 120 minutes at 85° C., z eq of methyl chloride are added to the reactor at this temperature. Reaction is continued for a further 120 minutes at 85° C. and the mixture is then cooled. The volatile constituents are distilled off and the reactor is evacuated. The crude product is washed twice with hot water and then dried and milled.

The degree of substitution by methyl groups DS (M), the degree of substitution by hydroxypropyl groups MS (HP) and the viscosity (V2 in mPa.s) in 2 wt. % strength aqueous solution (rotational viscometer; speed=2.55 s$^{-1}$; 20° C.) of the methylhydroxypropyl cellulose ether obtained in this way are given in Table 1. The NaCl content in all cases was less than 0.1 wt. %.

TABLE 1

| Example No. | x (g) | y (eq) | z (eq) | y + z (eq) | DS (M) | MS (HP) | V2 (mPa · s) | Comparison (C) or Invention (I) |
|---|---|---|---|---|---|---|---|---|
| 1. | 401 | 4.33 | 0 | 4.33 | 1.58 | 0.21 | 29,000 | C |
| 2. | 334 | 3.61 | 0.72 | 4.33 | 1.58 | 0.26 | 63,100 | C |
| 3. | 268 | 2.89 | 1.44 | 4.33 | 1.52 | 0.31 | 60,400 | I |
| 4. | 201 | 2.17 | 2.16 | 4.33 | 1.55 | 0.34 | 59,000 | I |
| 5. | 134 | 1.44 | 2.89 | 4.33 | 1.48 | 0.36 | 69,400 | I |
| 6. | 67 | 0.72 | 3.61 | 4.33 | 1.47 | 0.38 | 36,000 | C |
| 7. | 0 | 0 | 4.33 | 4.33 | 1.42 | 0.39 | 10,300 | C |

Examples 8 to 14 (MHPC)

In a 5 l autoclave, 260 g of cotton linters (moisture content 6.6%; in cupriethylenediamine: 1480 ml/g) are placed under an inert atmosphere by evacuating and refilling with nitrogen. Then a mixture of x g of dimethyl ether and y eq of methyl chloride is added to the reactor. Then 2.6 eq of sodium hydroxide in the form of a 50 wt. % strength aqueous caustic soda solution are sprayed onto the cellulose with stirring. After stirring for 60 minutes at 25° C., 0.8 eq of propylene oxide are added to the reactor and the mixture is heated to 85° C. After stirring for 40 minutes at 85° C., a further 1.0 eq of propylene oxide are added to the reactor over the course of 10 min. After stirring for a further 70 minutes at 85° C., z eq of chloromethane are added to the reactor at this temperature. Reaction is continued for a further 120 minutes at 85° C. and the mixture is then cooled. Volatile constituents are distilled off and the reactor is evacuated. The crude product is washed twice with hot water and then dried and milled.

The degree of substitution by methyl groups DS (M), the degree of substitution by hydroxypropyl groups MS (HP) and the viscosity (V2 in mPa.s) in 2 wt. % strength aqueous solution (rotational viscometer; speed=2.55 s$^{-1}$; 20° C.) of the methylhydroxypropyl cellulose ether obtained in this way are given in Table 2. The NaCl content in all cases is less than 0.1 wt. %.

TABLE 2

| Example No. | x (g) | y (eq) | z (eq) | y + z (eq) | DS (M) | MS (HP) | V2 (mPa · s) | Comparison (C) or Invention (I) |
|---|---|---|---|---|---|---|---|---|
| 8. | 401 | 4.33 | 0 | 4.33 | 1.56 | 0.25 | 50,600 | C |
| 9. | 334 | 3.61 | 0.72 | 4.33 | 1.62 | 0.37 | 64,900 | C |
| 10. | 268 | 2.89 | 1.44 | 4.33 | 1.55 | 0.52 | 49,900 | I |
| 11. | 201 | 2.17 | 2.16 | 4.33 | 1.50 | 0.69 | 46,200 | I |
| 12. | 134 | 1.44 | 2.89 | 4.33 | 1.42 | 0.71 | 41,400 | I |
| 13. | 67 | 0.72 | 3.61 | 4.33 | 1.39 | 0.77 | 30,900 | C |
| 14. | 0 | 0 | 4.33 | 4.33 | 1.32 | 0.81 | 15,900 | C |

Examples 15 to 20 (MHPC)

In a 5 l autoclave, 257 g of cotton linters (moisture content 5.5%; in cupriethylenediamine: 1480 ml/g) are placed under an inert atmosphere by evacuating and refilling with nitrogen. Then a mixture of 201 g of dimethyl ether and y eq of chloromethane is added to the reactor. Then 2.6 eq of sodium hydroxide in the form of a 50 wt. % aqueous caustic soda solution are sprayed onto the cellulose with stirring. After stirring for 60 minutes at 25° C., v eq of propylene oxide are added to the reactor and the mixture is heated to 85° C. After stirring for 180 minutes at 85° C., z eq of chloromethane are added to the reactor at this temperature. Then reaction is continued for a further 120 minutes at 85° C. and the mixture is then cooled. Volatile constituents are distilled off and the reactor is evacuated. The crude product is washed twice with hot water and then dried and milled.

The degree of substitution by methyl groups DS (M), the degree of substitution by hydroxypropyl groups MS (HP) and the viscosity (V2 in mPa.s) in 2 wt. % strength aqueous solution (rotational viscometer; speed=2.55 s$^{-1}$; 20° C.) of the methylhydroxypropyl cellulose ether obtained in this way are given in Table 3. The NaCl content in all cases is less than 0.1 wt. %.

TABLE 3

| Example No. | v (eq) | y (eq) | z (eq) | y + z (eq) | DS (M) | MS (HP) | V2 (mPa · s) | Comparison (C) or Invention (I) |
|---|---|---|---|---|---|---|---|---|
| 15. | 1 | 2.17 | 2.16 | 4.33 | 1.57 | 0.30 | 64,900 | I |
| 16. | 1 | 4.33 | 0 | 4.33 | 1.65 | 0.25 | 14,000 | C |
| 17. | 3 | 2.17 | 2.16 | 4.33 | 1.34 | 1.08 | 41,200 | I |
| 18. | 3 | 4.33 | 0 | 4.33 | 1.59 | 0.65 | 10,700 | C |
| 19. | 5 | 2.17 | 2.16 | 4.33 | 1.31 | 1.76 | 16,900 | I |
| 20. | 5 | 4.33 | 0 | 4.33 | 1.53 | 0.89 | 9,300 | C |

Examples 21 to 28 (MHPC)

In a 5 l autoclave, 250 g of cotton linters (moisture content 2.8%; in cupriethylenediamine: 1750 ml/g) are placed under an inert atmosphere by evacuating and refilling with nitrogen. Then a mixture of x g of dimethyl ether and 164 g (=y$^1$) of methyl chloride is added to the reactor. Then 2.6 eq of sodium hydroxide in the form of a 50 wt. % strength aqueous caustic soda solution are sprayed onto the cellulose with stirring. After stirring for 60 minutes at 25° C., 0.8 eq of propylene oxide are added to the reactor and the mixture is heated to 85° C. After stirring for 120 minutes at 85° C., a further 164 g (=y$^2$) of methyl chloride are added to the reactor at this temperature. Then reaction is continued for 120 minutes at 85° C. and the mixture is then cooled. Volatile constituents are distilled off and the reactor is evacuated. The crude product is washed twice with hot water and then dried and milled.

The degree of substitution by methyl groups DS (M), the degree of substitution by hydroxypropyl groups MS (HP) and the viscosity (V1 in mPa.s) in 1 wt. % strength aqueous solution (rotational viscometer; speed=2.55 s$^{-1}$; 20° C.) of the methylhydroxypropyl cellulose ether obtained in this way are given in table 4. The NaCl content in all cases is less than 0.1 wt. %.

TABLE 4

| Example No. | x (g) | x/y$^1$ (wt. %) | y$^2$ (g) | DS (M) | MS (HP) | V1 (mPa · s) | Comparison (C) or Invention (I) |
|---|---|---|---|---|---|---|---|
| 21. | 305 | 65/35 | 164 | 1.54 | 0.36 | 11,600 | I |
| 22. | 247 | 60/40 | 164 | 1.56 | 0.34 | 14,200 | I |
| 23. | 201 | 55/45 | 164 | 1.55 | 0.34 | 9,800 | I |
| 24. | 164 | 50/50 | 164 | 1.52 | 0.34 | 12,600 | I |
| 25. | 135 | 45/55 | 164 | 1.51 | 0.33 | 12,100 | I |
| 26. | 110 | 40/60 | 164 | 1.51 | 0.32 | 12,800 | I |
| 27. | 89 | 35/65 | 164 | 1.55 | 0.36 | 15,300 | I |
| 28. | 0 | 0/100 | 164 | 1.52 | 0.31 | 3,800 | C |

Example 29 to 30 (MHBC)

In a 5 l autoclave, 250 g (1.5 mol) of cotton linters (moisture content 2.8%; in cupriethylenediamine: 1750 ml/g) are placed under an inert atmosphere by evacuating and refilling with nitrogen. Then a mixture of x g of dimethyl ether and y eq of methyl chloride are added to the reactor. Then 2.6 eq of sodium hydroxide in the form of a 50 wt. % aqueous caustic soda solution are sprayed onto the cellulose with stirring. After stirring for 60 minutes at 25° C., 108 g of butylene oxide are added to the reactor and the mixture is heated to 85° C. After stirring for 180 minutes at 85° C., z eq of methyl chloride are added to the reactor at this temperature. Then reaction is continued for a further 120 minutes at 85° C. and the mixture is then cooled. Volatile constituents are distilled off and the reactor is evacuated. The crude product is washed twice with hot water and then dried and milled.

The degree of substitution by methyl groups DS (M), the degree of substitution by hydroxybutyl groups MS (HB) and the viscosity (V2 in mPa.s) in 2 wt. % strength aqueous solution (rotational viscometer; speed=2.55 s$^{-1}$; 20° C.) of the methylhydroxybutyl cellulose ether obtained in this way are given in Table 5. The NaCl content in all cases is less than 0.1 wt. %.

TABLE 5

| Example | x (g) | y (eq) | z (eq) | y + z (eq) | DS (M) | MS (HB) | V2 (mPa · s) | Comparison (C) or Invention (I) |
|---|---|---|---|---|---|---|---|---|
| 29. | 201 | 2.17 | 2.16 | 4.33 | 1.61 | 0.44 | 67800 | I |
| 30. | 201 | 4.33 | 0 | 4.33 | 1.49 | 0.11 | 30100 | C |

Examples 31 to 32 (MHEHPC)

In a 5 l autoclave, 254 g of cotton linters (moisture content 4.2%; in cupriethylenediamine: 1750 ml/g) are placed under an inert atmosphere by evacuating and refilling with nitrogen. Then a mixture of x g of dimethyl ether and y eq of methyl chloride are added to the reactor. Then 2.6 eq of sodium hydroxide in the form of a 50 wt. % strength aqueous caustic soda solution are sprayed onto the cellulose with stirring. After stirring for 60 minutes at 25° C., 0.6 eq of propylene oxide and 0.4 eq of ethylene oxide are added to the reactor and the mixture is heated to 85° C. After stirring for 120 minutes at 85° C., z eq of methyl chloride are added to the reactor at this temperature. Then reaction is continued for a further 120 minutes at 85° C. and the mixture is then cooled. Volatile constituents are distilled off and the reactor is evacuated. The crude product is washed twice with hot water and then dried and milled.

The degree of substitution by methyl groups DS (M), the degree of substitution by hydroxyethyl groups MS (HE), the degree of substitution by hydroxypropyl groups MS (HP) and the viscosity (V2 in mPa.s) in 2 wt. % strength aqueous solution (rotational viscometer; speed=2.55 s$^{-1}$; 20° C.) of the methylhydroxy-ethylhydroxypropyl cellulose ether obtained in this way are given in Table 6. The NaCl content in all cases is less than 0.1 wt. %.

TABLE 6

| Example no. | x (g) | y (eq) | z (eq) | y + z (eq) | DS (M) | MS (HP) | MS (HE) | V2 (mPa · s) | Comparison (C) or Invention (I) |
|---|---|---|---|---|---|---|---|---|---|
| 31. | 201 | 4.33 | 0 | 4.33 | 1.50 | 0.16 | 0.17 | 71000 | C |
| 32. | 201 | 2.17 | 2.16 | 4.33 | 1.52 | 0.26 | 0.26 | 70400 | I |

Examples 33 to 34 (MHBHPC)

In a 5 l autoclave, 254 g of cotton linters (moisture content 4.2%; in cupriethylenediamine: 1750 ml/g) are placed under an inert atmosphere by evacuating and refilling with nitrogen. Then a mixture of x g of dimethyl ether and y eq of methyl chloride is added to the reactor. Then 2.6 eq of sodium hydroxide in the form of a 50 wt. % strength aqueous caustic soda solution are sprayed onto the cellulose with stirring. After stirring for 60 minutes at 25° C., 0.5 eq of butylene oxide and 0.5 eq of propylene oxide are added to the reactor and the mixture is heated to 85° C. After stirring for 180 minutes at 85° C., z eq of chloromethane are added to the reactor at this temperature. Then reaction is continued for a further 120 minutes at 85° C. and the mixture is then cooled. Volatile constituents are distilled off and the reactor is evacuated. The crude product is washed twice with hot water and then dried and milled.

The degree of substitution by methyl groups DS (M), the degree of substitution by hydroxybutyl groups MS (HB), the degree of substitution by hydroxypropyl groups MS (HP) and the viscosity (V2 in mPa.s) in 2 wt. % strength aqueous solution (rotational viscometer; speed=2.55 s$^{-1}$; 20° C.) of the methylhydroxy-butylhydroxypropyl cellulose ether obtained in this way are given in Table 7. The NaCl content in all cases is less than 0.1 wt. %.

What is claimed is:

1. A process for preparing alkylhydroxyalkyl cellulose comprising the steps of:
   a) alkalizing cellulose with an aqueous caustic solution containing from 1.5 to 5.5 equivalents of alkali metal hydroxide per anhydroglucose unit (AGU) of said cellulose, in the presence of a suspension agent which contains alkyl halide in the amount of from (equivalents of alkali metal hydroxide per AGU minus 1.4) to (equivalents of alkali metal hydroxide per AGU plus 0.8);
   b) reacting the alkalised cellulose of step a) with one or more alkylene oxides at a temperature higher than 65° C.;
   c) adding alkyl halide, to the product of step b), in an amount of at least the difference between (i) the equivalents of alkyl halide per AGU in step a) and (ii) the equivalents of alkali metal hydroxide added per AGU in step a), provided that the amount of additionally added alkyl halide is at least 0.2 equivalents per AGU;
   d) isolating alkylhydroxyalkyl cellulose from the reaction mixture of step c); and
   e) optionally purifying the isolated alkylhydroxyalkyl cellulose.

2. The process of claim 1 wherein said suspension agent is dimethyl ether.

3. The process of claim 1 wherein said alkyl halide is selected from the group consisting of methyl chloride, ethyl chloride, ethyl bromide and propyl iodide.

4. The process of claim 2 wherein in step a), said alkyl halide is methyl chloride, and the parts by weight ratio of dimethyl ether to methyl chloride is in the range of 70:30 to 20:80.

5. The process of claim 1 wherein said alkylene oxide is selected from ethylene oxide, propylene oxide, butylene oxide and mixtures thereof.

6. The process of claim 1 wherein the temperature under which steps b) and c) are each performed is independently in the range of 65 to 110° C.

TABLE 7

| Example No. | x (g) | y (eq) | z (eq) | y + z (eq) | DS (M) | MS (HP) | MS (HB) | V2 (mPa · s) | Comparison (C) or Invention (I) |
|---|---|---|---|---|---|---|---|---|---|
| 33. | 201 | 4.33 | 0 | 4.33 | 1.49 | 0.12 | 0.06 | 72400 | C |
| 34. | 201 | 2.17 | 2.16 | 4.33 | 1.55 | 0.22 | 0.20 | 68700 | I |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

7. The process of claim 1 wherein the alkylhydroxyalkyl cellulose prepared is methylhydroxypropyl cellulose (MHPC).

* * * * *